(No Model.) 3 Sheets—Sheet 2.

A. J. & W. J. HUGHES.
HAY LOADER.

No. 433,865. Patented Aug. 5, 1890.

WITNESSES:
Fred G. Dieterich
Edw. W. Byrn.

INVENTOR:
Albert J. Hughes
William J. Hughes
BY Munn & Co
ATTORNEYS

THE NORRIS PETERS CO., PHOTO-LITHO., WASHINGTON, D. C.

(No Model.) 3 Sheets—Sheet 3.
A. J. & W. J. HUGHES.
HAY LOADER.

No. 433,865. Patented Aug. 5, 1890.

WITNESSES:
Jos. A. Ryan
Edw. W. Byrn

INVENTOR:
Albert J. Hughes
William J. Hughes
BY Mann & Co.
ATTORNEYS

UNITED STATES PATENT OFFICE.

ALBERT J. HUGHES AND WILLIAM J. HUGHES, OF LISBON, (DAKOTA TERRITORY,) NORTH DAKOTA.

HAY-LOADER.

SPECIFICATION forming part of Letters Patent No. 433,865, dated August 5, 1890.

Application filed September 30, 1889. Serial No. 325,598. (No model.)

*To all whom it may concern:*

Be it known that we, ALBERT J. HUGHES and WILLIAM J. HUGHES, of Lisbon, in the county of Ransom, in the Territory of Dakota, have invented a new and useful Improvement in Hay-Loaders, of which the following is a specification.

Our invention is in the nature of an improved hay-loader, whose object is to deliver the hay on the load in the smallest and most compressed or compact shape, concentrating its delivery so as to be less liable to be scattered by the wind and more easily stowed or disposed in its proper place on the load.

It consists in the peculiar construction and arrangement of parts, which we will now proceed to fully describe with reference to the drawings, in which—

Figure 1:
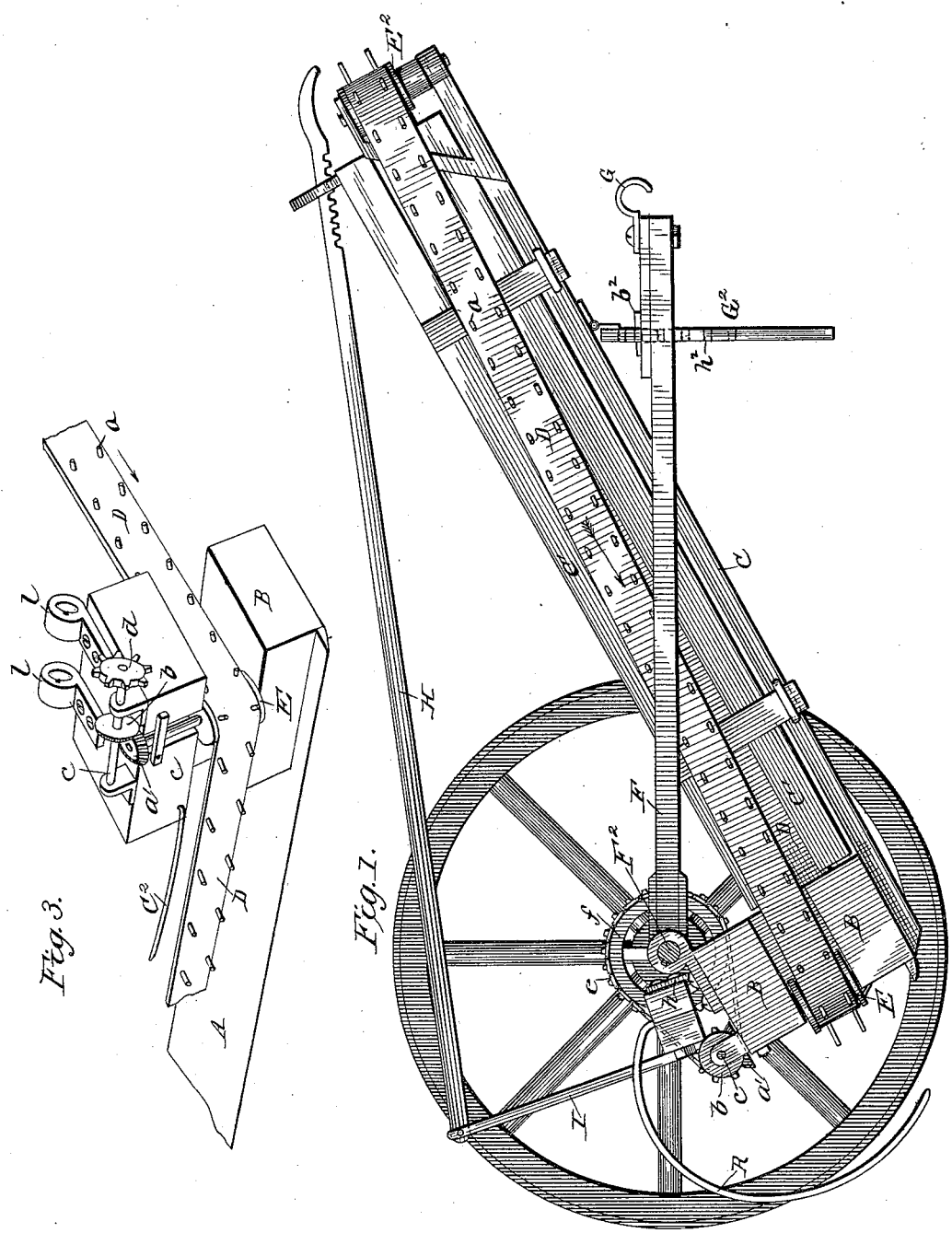
Figure 2:
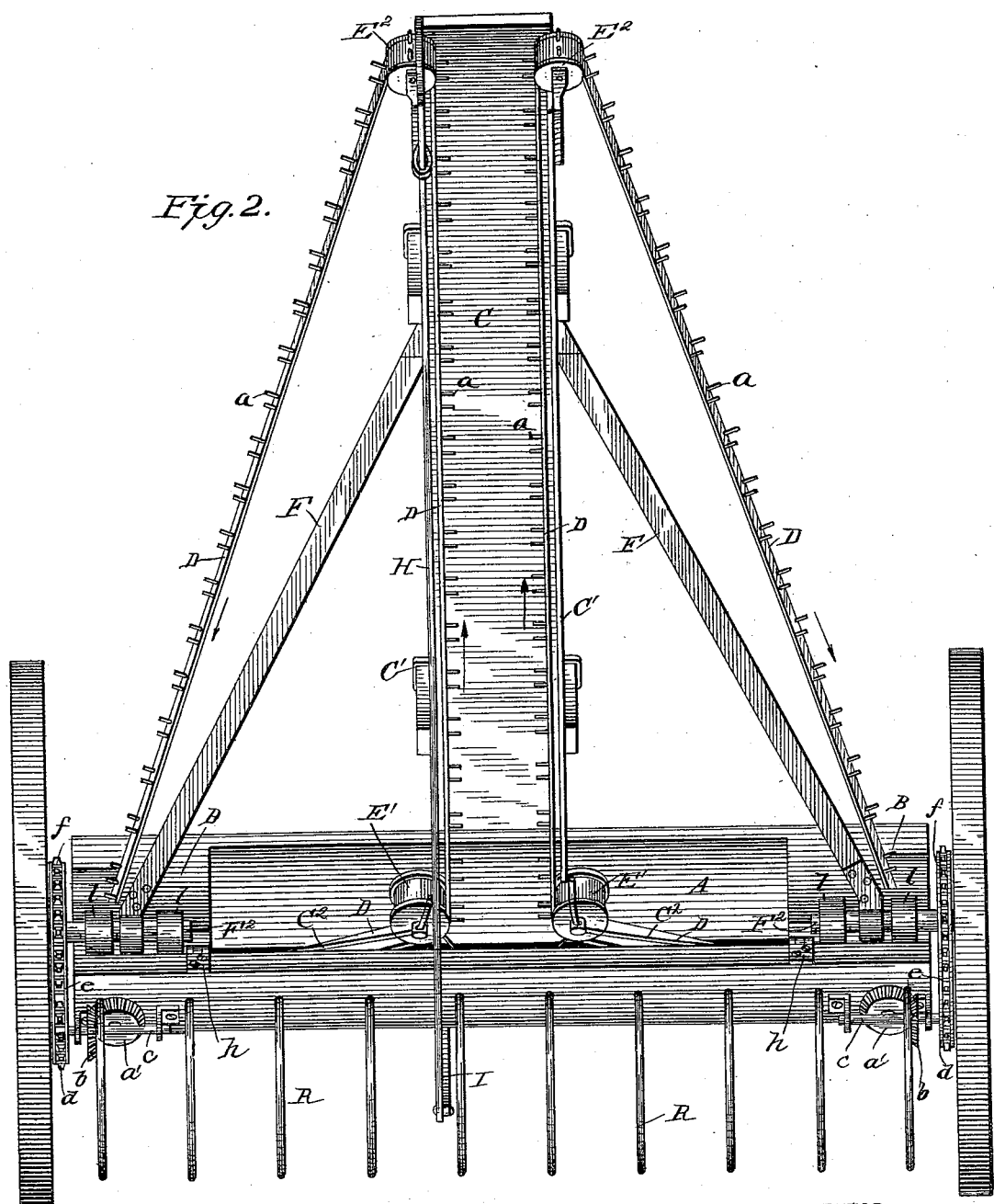
Figure 4:
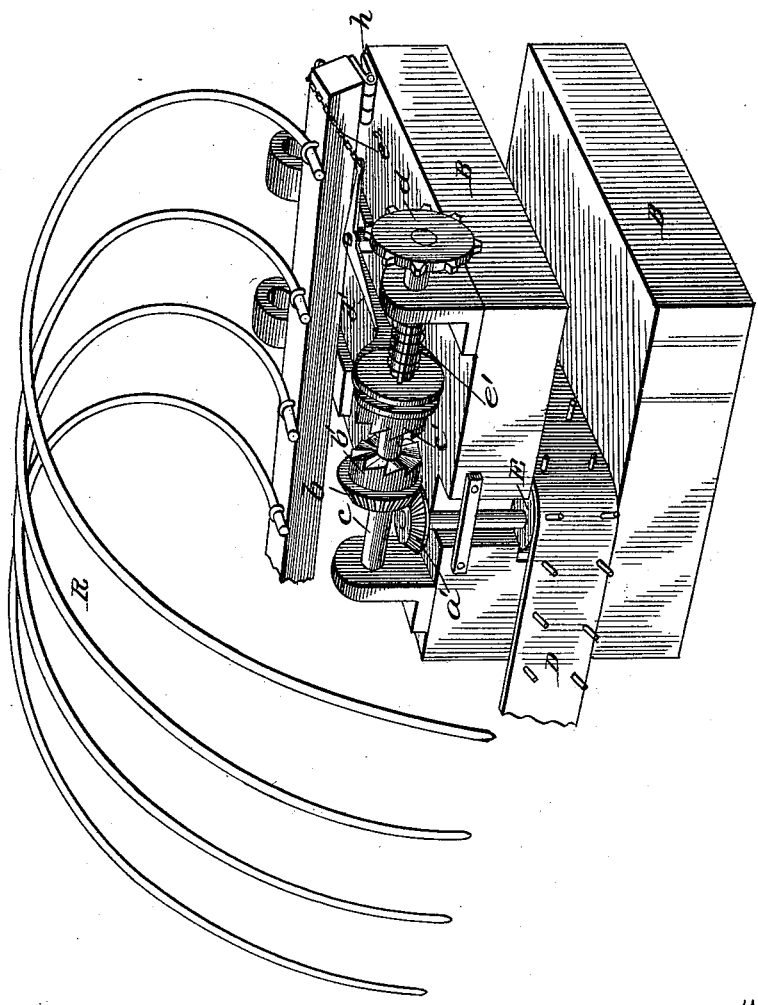

Figure 1 is a side elevation. Fig. 2 is a plan view. Fig. 3 is a detail in perspective of the gears for operating the toothed belt. Fig. 4 is a perspective view showing the construction and arrangement of the clutch.

R is an ordinary horse hay-rake on wheels.

A represents a stout board having elevated blocks or frames B (see Fig. 3) at its ends about twelve inches high. This board corresponds in length to the length of the rake, whose head is hinged at $h$ to the elevated end blocks or frames B. To the middle of the board there is attached at right angles an elevator-board C, which is of a length sufficient to reach to the top of the load on the wagon. The space above board A and between blocks B forms a gathering-chamber for the hay just in front of the bend or hollow of the rake-teeth, while the board C forms the bottom of an elevator-trough having sides C' C'.

To gather the hay from the ends of rake and take it up the elevator-board C, two endless belts, bands, or chains D are employed. These endless belts have upon their outer faces teeth or tines $a$, that catch and carry the hay. Each belt is arranged alike in the form of a triangle and passes around a sprocket wheel or roller E near the outer end of the gathering-frame, passing thence to the middle of the gathering-frame and around a sprocket wheel or roller E' near the edge of board C, and passes thence to the top of board C and around a sprocket wheel or roller $E^2$, and thence obliquely to the sprocket-wheel E again.

From the sprocket-wheel E the toothed belt carries the hay gathered by the rake near its ends to the center, the sprocket wheels or rollers E' E' being set a little farther to the front, so as to form a converging throat into the elevator-trough, which is formed by the guide bars $C^2$ and the two belts on opposite sides of the trough, which belts, being armed with teeth projecting into the trough, serve to compress and raise the hay to the upper end of the elevator. In action the endless belts travel in the direction of the arrows. To transmit motion to said belts, the shaft of each sprocket wheel or roller E (see Fig. 3) is extended above the elevated block or frame B, and is provided with a bevel-wheel $a'$, that engages the bevel-wheel $b$ of a short horizontal shaft $c$, arranged in bearings in the frame-work. The outer end of each shaft $c$ is provided with a chain-wheel $d$, which is connected by a chain $e$, Figs. 1 and 2, to a chain-wheel $f$ on each of the drive-wheels of the machine or loader, so that the motion of the drive-wheels in traveling over the field imparts the necessary motion to the elevator-belts.

F F are hinged draft-bars, which are hung upon the short axles $F^2$ $F^2$ of the loader in the rear and converge toward the front, and are provided with a hook G for connecting with the wagon. These short axles are rigidly keyed in lugs $l$ $l$ on the elevated frames B and carry the main running-wheels which revolve loosely upon said axles.

$G^2$ is a brace extending from the draft-bars to the elevator. This brace is hinged to the elevator and passes through a hole in a plate on the front end of the draft-bars, and is provided with a series of holes $h^2$ and a bolt $b^2$, by which the angle of the elevator may be adjusted.

H is a handle-rod for working the dumping-lever I of the rake and throwing the machinery out of gear.

In making use of our loader, the hook G of the draft-bars is fastened to the rear end of the wagon, and the latter being driven across the field the hay is gathered by the rake and then compressed or compacted and raised by the loader onto the wagon in a very simple and convenient manner and with the expenditure of but little power.

In connection with the driving mechanism for the elevator-belts we propose to employ a clutch-gear, so as to connect or disconnect the drive-wheels and the elevator-belt at will. For this purpose the bevel-wheel $b$, Fig. 4, is arranged to revolve loosely upon shaft $c$, and is provided on one side with clutch-teeth $b'$, and a corresponding clutch-section $c'$ is arranged to slide on shaft $c$, but to revolve with it. A spiral spring $e'$ normally holds the two clutch-sections engaged, while an elbow-lever $d'$ serves to pull them apart. This elbow-lever has one arm embracing the clutch-section $c'$, and has its other arm connected by chain $e^2$ with the head of the rake R, so that when the rake is raised and the machine is out of action, as shown, the clutch-section $c'$ is separated from $b'$, and the motion of shaft $c$ is not imparted to the gathering and elevator belts.

We are aware of the Patent No. 94,782, dated September 14, 1869, in which a pair of triangularly-arranged belts serves to gather the hay and an independent belt serves to elevate it, and we do not claim such arrangement. In our device it will be seen that but one pair of belts is used, and these extend along the rake and also up the incline of the elevator-board, so as to perform in a simple and effective manner the several functions of gathering, compressing, and elevating the hay.

Having thus described our invention, what we claim as new is—

1. A hay-loader consisting of a gathering-chamber, an elevator-board C, connected to the middle part of the main frame of the gathering-chamber at right angles thereto, the two sets of rollers E E' $E^2$, and two endless belts arranged each in triangular shape about the rollers and extending both along the rake and up the elevator-board and provided with projecting teeth or tines, and means for moving said belts, substantially as shown and described.

2. The combination of main frame A, having elevated end blocks or frames B, short axles with wheels connected to the end blocks, a rake-head with curved teeth hinged also to the elevated blocks or frames, the converging draft-bars hinged to the short axles, and an adjustable brace connecting the draft-bars to the elevator, substantially as shown and described.

3. The combination, with a set of sulky-rake teeth and supporting-wheels with sprocket-wheels attached, of a loader attachment consisting of main frame forming gathering-chamber, right-angular elevator-board C, the rollers E E' $E^2$, the endless belts with teeth distended around the rollers in triangular shape and extending both along the rake and up the elevator-board, the bevel-gears $a'$ $b$, shaft $c$, sprocket-wheel $d$, and chain $e$, connected with the sprocket-wheel of the drive-wheel, substantially as and for the purpose described.

ALBERT J. HUGHES.
WILLIAM J. HUGHES.

Witnesses:
GILBERT LA DU,
THOS. J. HARRIS.